Aug. 10, 1926.

A. C. HAUCK 1,595,975

MANUFACTURE OF WOODEN HEELS

Filed Dec. 29, 1924  4 Sheets-Sheet 1

INVENTOR
Andrew C. Hauck
BY
Philip S. ATTORNEY

Aug. 10, 1926.

A. C. HAUCK 1,595,975

MANUFACTURE OF WOODEN HEELS

Filed Dec. 29. 1924  4 Sheets-Sheet 3

INVENTOR
Andrew C. Hauck
BY
Philip S. McLean
ATTORNEY

Aug. 10, 1926.

A. C. HAUCK 1,595,975

MANUFACTURE OF WOODEN HEELS

Filed Dec. 29, 1924    4 Sheets-Sheet 4

INVENTOR
Andrew C. Hauck
BY
ATTORNEY

Patented Aug. 10, 1926.

1,595,975

UNITED STATES PATENT OFFICE.

ANDREW C. HAUCK, OF BROOKLYN, NEW YORK, ASSIGNOR TO WILLIAMSBURGH WOOD HEEL COMPANY, OF BROOKLYN, NEW YORK, A CORPORATION OF NEW YORK.

MANUFACTURE OF WOODEN HEELS.

Application filed December 29, 1924. Serial No. 758,593.

In the manufacture of wooden heels many difficulties are involved, largely because of the inherent characteristics of the material operated upon. Thus, because of the grain of the wood, it has always been considered necessary in practical experience to use one cutter for turning one side of the heel block and a second reversely operating cutter for turning the opposite side of the heel block, as stated on page 2 of the Russ. Patent No. 1,247,335. This involves a duplication of parts and the necessity for very fine adjustments and further requires considerable care and skill in the use and operation of the machine.

Special objects of this invention are to simplify the manufacture and to accomplish the turning of the heels in a single spindle machine.

A further special object is to enable the production of heels of different sizes from the same cutter and without any need for changing the setting of the individual cutter blades.

The attainment of the foregoing involves certain novel features of construction, combination and relation of parts as disclosed in the following specification, wherein practical and preferred embodiments of the invention are illustrated and described.

Figure 1:
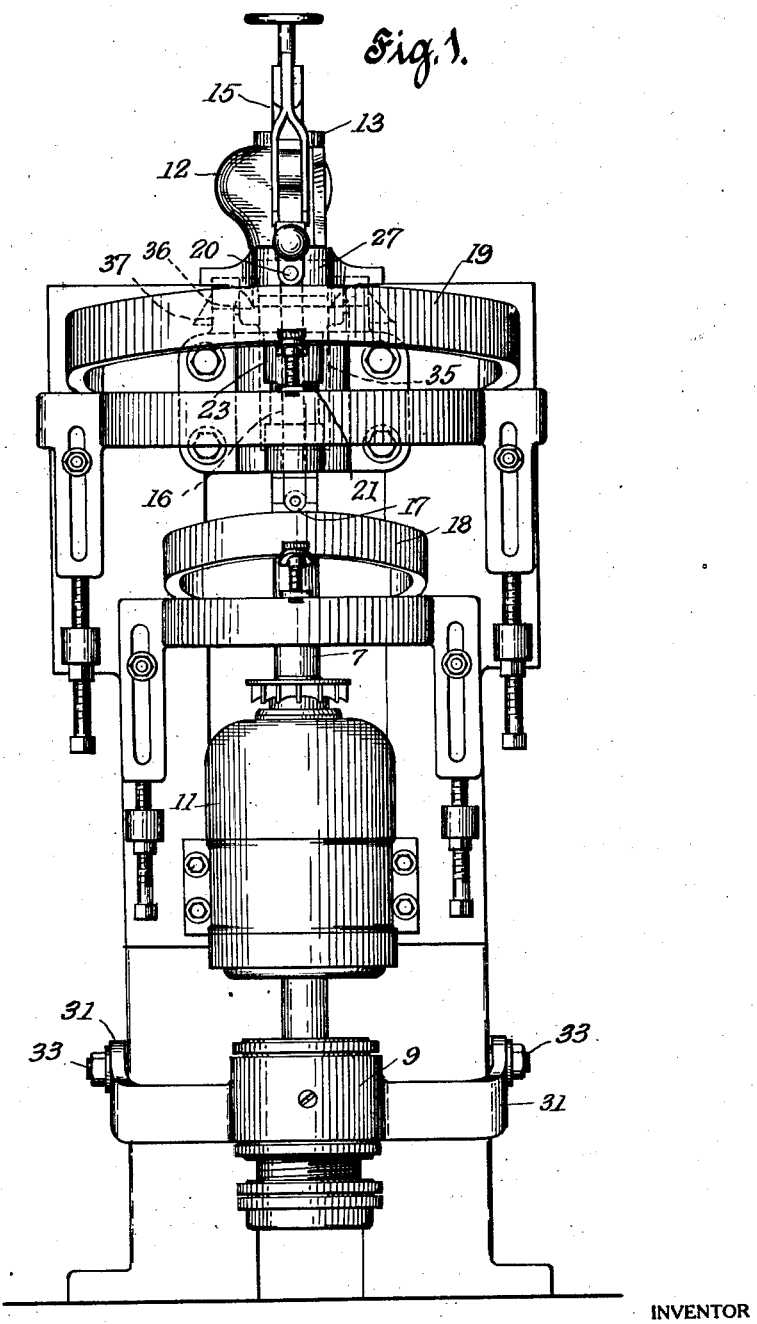
Figure 1 is a front view of the complete machine.

In the illustration the single cutter spindle is designated 7 and is shown journaled in substantially upright position in upper and lower bearings 8, 9, spaced by a connecting bar 10. This shaft is driven by any suitable source of power such as the electric motor indicated at 11.

The cutter is shown as made up of three equidistantly spaced blades 12 secured in a clamp 13 on the upper end of the shaft and curved to produce the desired profile.

The heel block indicated at 14 is removably clamped in a jack 15 of suitable construction and which is shown as carried by a pivotal post 16 provided at its lower end with a roller 17 riding on a cam track 18. This construction controls the vertical position of the jack and a cam track 19 engaging a roller 20 controls the tilting or angular disposition of the jack. The jack is directed toward and away from the cutter by a guide shown in Figures 1 to 3 as a block 21 in which the jack post is pivoted and which has a sliding engagement in a horizontal way 22 provided in a bracket 23 extending forwardly from the cutter spindle. This bracket is slotted vertically at 24 for the free passage of the jack post, the slot being wide enough at the inner end at 24' to enable the extent of movement necessary to carry one side of the block across the face of the cutter, as indicated diagrammatically in Figure 5.

Figure 4:
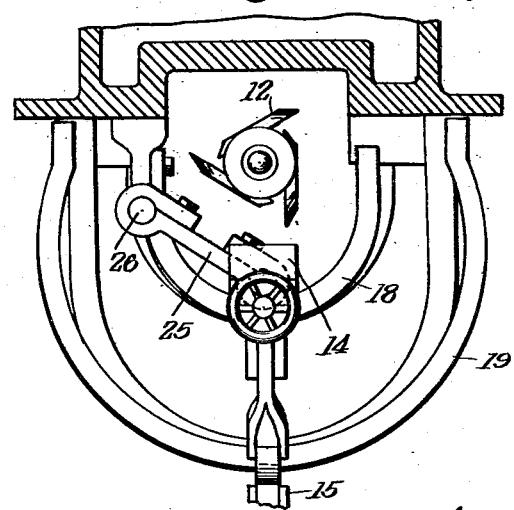
Figure 4 is a part sectional plan of a modified form of the machine.

As a modification, the to and fro movement of the jack may be provided for by journaling the jack post in the forward end of a swinging arm 25 which is itself pivotally supported at 26, Figure 4.

A guide 27 is shown extending completely around the foot of the cutter for engagement by a former or pattern 28 on the jack post.

Operation.

Figure 2:
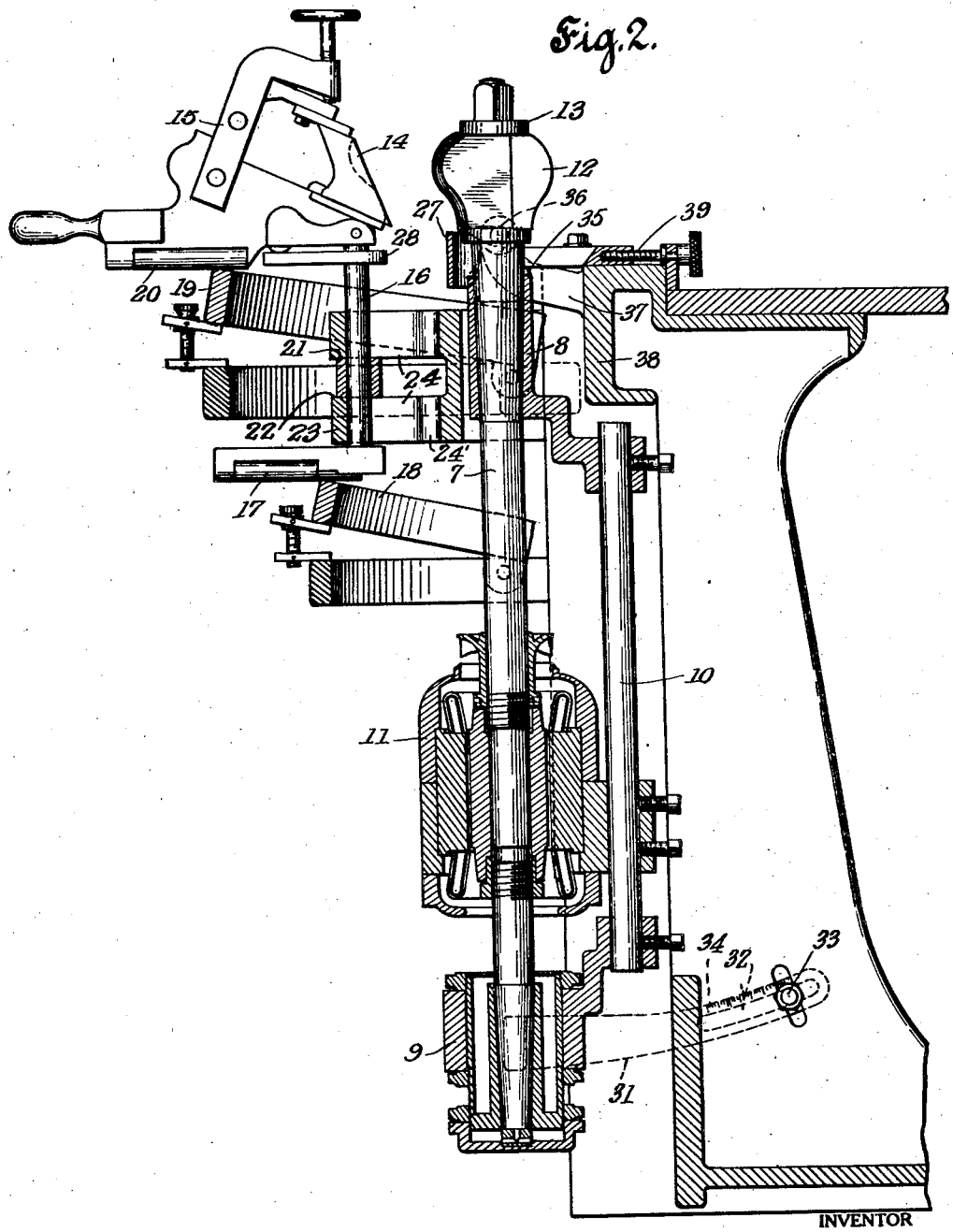
Figure 2 is a vertical sectional view of the same.
Figure 3:
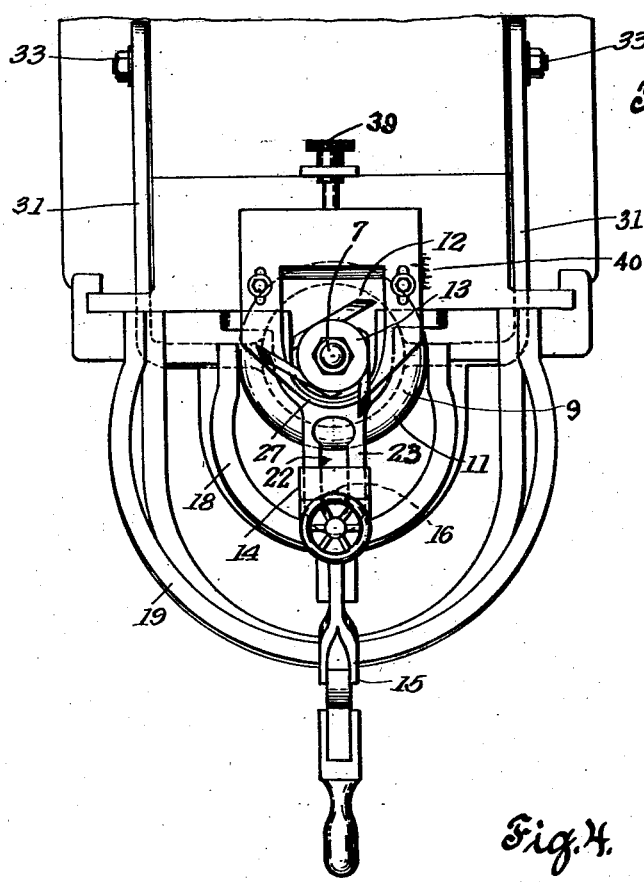
Figure 3 is a plan view of the machine.
Figure 5:
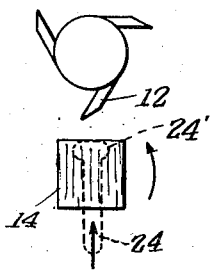
Figures 5 to 10 are diagrammatic representations of how first one side and then the opposite side of the block is shaped on the same cutter.
Figure 6:
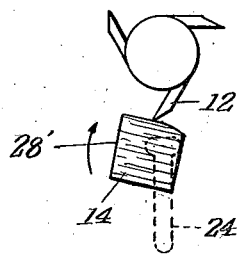
Figure 7:
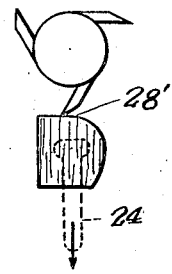
Figure 8:
Figure 9:
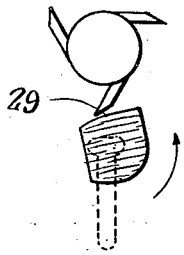
Figure 10:
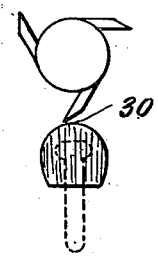

With the cutter rotating right-handedly, as indicated in Figure 5, the block is advanced toward the cutter either in a direct line, with the construction of Figures 1 to 3, or through a slight arc about the center 26 in the construction of Figure 4. The jack is then turned to first present the right-hand side of the block to the cutter, as indicated in Figure 6 and rotated to carry the cut back to substantially the center line of the heel, as indicated at 28', Figure 7. With this first half of the cut completed the jack is withdrawn, Figure 8, and turned to present the forward portion of the left-hand side of the block to the cutter, as indicated at 29, Figure 9, and advanced and turned as indicated at 30, Figure 10, to carry this cut clear around to the back of the heel and up to the end of the first cut.

The cutter is working with the grain during the first operation and for the major part of the second operation the most of the wood being removed in these periods and only a very small proportion of the material remaining to be cut away during the time that the cut is being extended from the second side around to the back of the heel. The possibility of splitting or chipping is thereby practically eliminated. The use of three cutter blades rotating at high speed also helps make it possible to extend this last portion of the cut against the grain of the wood without injury to the block or to the cutters and without imposing too great a strain on the operator.

Another feature about thus first finishing both sides and half the end of the block is that most of the material is cut away before starting to cut against the grain and the cutter therefore in this last stage cannot get sufficient hold on the block to strip it from the jack.

A further important feature of this invention is the provision of means whereby different sizes of the same style heel may be produced without changing the cutters. The means for this purpose consists in the illustration, in addition to the "size" gage 27, of a pivotal mounting for the cutter spindle, enabling the cutter to be tilted bodily forwardly or backwardly. This pivotal support is provided in the disclosure by constructing the upper spindle bearing 8 with lugs 35 at the sides thereof pivoted at 36 in bearing brackets 37 projected forwardly from the main frame 38 of the machine. To secure the spindle in either its vertical or tilted relations, the lower bearing bracket 9 is shown as having rearwardly extending arms 31 with arcuate slots 32 through which clamping bolts 33 are passed. A scale 34 is indicated to enable the tilted position of the shaft to be duplicated at will.

It will be noted that the pivotal center 36 about which the spindle is tilted corresponds substantially to the lower end of the cutter so that in the tilting of the shaft, the cutter is simply inclined one way or the other. It will be seen that in these tilting adjustments, the variations at the top of the heel will be proportionately greater than the variations at the base of the heel.

The shaping guide 27 which cooperates with the former 28 remains stationary during the tilting adjustments of the cutter but can be set forwardly or back by means of the adjusting screw 39.

In machines in use at the present time the changes from one heel size to another are usually effected by adjusting guides somewhat on the order of that shown at 27 so as to hold the cooperating former further away from the cutters for larger sizes or allow the jack to come closer to the cutters for smaller sizes. These adjustments naturally simply change the depth of the cut and it has been customary to set the cutter blades at different angles, as by substituting differently angled supporting collars for the cutter blades, these different collars having the effect of angling the cutter blades forwardly, for instance, for the larger heels so as to make the cut proportionately deeper at the top than at the heel seat or in the reverse fashion for smaller heels so as to leave a proportionately greater amount of material at the top of the heel.

This invention, it will be seen, eliminates entirely the necessity for substituting differently angled supporting collars and permits the same effects to be obtained without disturbing the initial setting of the cutter blades. For convenience, the adjustable guide 27 may have a gage or scale such as indicated at 40 in Figure 3, laid off in heel sizes, if desired, which with the scale 34 will enable the operator to quickly set the machine for any desired size. For example, if a larger size heel is to be cut, the guide 27 is advanced to the proper setting so as to hold the jack further away from the cutter and in order to preserve the desired fine lines of the heel, the cutter shaft is swung inwardly at the bottom to the proper reading of the scale 34 so as to incline the top of the cutter forwardly and hence increase the cut at the top of the heel over the cut made at the heel seat portion of the block. For smaller heels, the size gage 27 is backed off to increase the cut and the cutter is inclined backwardly to decrease the cut at the top of the heel and hence leave somewhat more material at that point.

These adjustments thus have a cooperative effect upon the shaping of the heel and while they will ordinarily be made in the relation described, that is, a tilting forwardly of the cutter for the larger sizes and a tilting back of the cutter for the smaller sizes, it should be understood that reverse adjustments may be made and other variations resorted to to obtain different configurations and different styles.

To save expense and time it has been customary with the collar method of adjustment to use the same collars for about three consecutive sizes. If these collars were angled proportionately for one size, this would mean that the other two sizes would be merely approximate. With this invention, all such approximation is done away with, as the cutter can be quickly set at the proper angle for each and every size.

The present invention has the double advantage of using only a single set of cutters instead of the customary two sets of cutters, and further, of enabling that single set of cutters to fashion different sizes of heels without the necessity of changing or adjusting the cutter blades. With the single set of cutters also the heels can be turned without leaving a line at the back of the heel where the two cuts meet such as is usually apparent on the product of two spindle machines. In the two spindle machines it is a practical impossibility to adjust both sets of cutters, gages and cams exactly alike and this usually makes it necessary to smooth off the back of the heel to remove the line left where the two cuts meet. In the present machine, however, where the cutting is all done with the one set of blades, the cuts from the opposite sides of the block necessarily meet accurately at the back of the heel, thus eliminating any need for subsequent finishing operations.

Furthermore, with this invention there is no need for filing the cam tracks because these tracks are always guiding the jack with respect to only the one cutter. This eliminates the need of "truing up" the cam tracks by experimentation to bring the jack into the same cooperative relation to the two cutters, which has been more or less the customary practice with two spindle machines.

The camtracks 18, 19, are shown as of the well known Edson type (Patent #25,326 of September 6th, 1859) because at times a pivotal adjustment of such tracks is desirable, but it will be understood that if desired, these tracks may be of rigid construction or adjusted other than by the Edson pivoting action. It will be understood further that the terms employed herein are used in a descriptive rather than in a limiting sense, except possibly for such limitations as may be imposed by the prior art.

What is claimed is:

1. A single spindle wood heel turning machine, comprising an upright spindle, a multiple bladed cutter carried by said spindle, a heel block jack and means for guiding said jack to carry one side and part of the end of the block in one direction past the cutter and to then carry the opposite side and the remaining end portion of the block past the cutter in the opposite direction.

2. A single spindle wood heel turning machine, comprising an upright spindle, a multiple bladed cutter carried by said spindle, a heel block jack and means for guiding said jack to carry one side and part of the end of the block in one direction past the cutter and to then carry the opposite side and the remaining end portion of the block past the cutter, in the opposite direction, said means including a guide extending about the front and to opposite sides of the cutter shaft and a former on the jack adapted to engage at its opposite sides with the front and the opposite side portions of the guide extending about the cutter shaft.

3. The process of turning wooden heels with a single cutter rotating continuously in one direction, which comprises relatively shifting the heel block and cutter to cause the cutter to trim one side and partly about the end of the heel block and then relatively shifting the block and cutter to cause the same cutter to trim the opposite side and finally the remaining portion of the end of the block.

4. The process of turning wooden heels with a single cutter rotating continuously in one direction which comprises first bringing one side of the block into cooperative engagement with the cutter and swinging the block as a continuation of the same movement to cause the cutter to trim to substantially the center line at the back of the heel, then withdrawing the heel block from the cutter and reversing the block to bring the opposite side into engagement with the cutter and advancing the block along such side and finally swinging the block in the reverse direction to complete the cut from said last mentioned side around to substantially the center at the back of the heel.

5. In a wood heel turning machine, an upright cutter spindle, a heel block support, means for varying the angle of the cutter spindle with respect to the vertical to tilt the cutter and thereby vary the depth of cut for different sizes of heels, and a pattern guide for the heel block support, said guide being adjustable to various extents at different angles relatively to said cutter spindle.

6. In a wood heel turning machine, an upright cutter spindle a guide about the forward portion of said spindle, a jack having a former for engagement with said guide, means for enabling a tilting adjustment of the cutter shaft with respect to the guide and jack, and means for enabling a to and fro adjustment of the guide about the spindle in any of the variously tilted adjudgments of the cutter shaft.

7. In a wood heel turning machine, an upright cutter spindle, a guide about the forward portion of said spindle, a jack having a former for engagement with said guide and means for enabling a titlting adjustment of the cutter shaft with respect to the guide and jack, said guide being adjustable with respect to the spindle and the jack being adjustable with respect to both the guide and the angularly adjustable spindle.

8. A wood heel turning machine comprising a cutter, a heel block jack adjustable thereto and mounted on a pivot post, a block in which said pivot post is journaled and a guide for said block extending on a substantially radial line forwardly from the center of the cutter.

9. A wood heel turning machine comprising a cutter, a heel block jack adjustable thereto and mounted on a pivot post, a block in which said pivot post is journaled and a guide for said block, said guide having a horizontal way for the block and a vertical way for the pivot post.

10. A wood heel turning machine comprising a cutter, a heel block jack adjustable thereto and mounted on a pivot post, a block in which said pivot post is journaled and a guide for said block, said guide having a horizontal way for the block and a vertical way for the pivot post and said vertical way being enlarged at the inner end of the same to enable an additional lateral adjustment of the jack with respect to the cutter.

11. In a wood heel turning machine, an upright cutter spindle, upper and lower bearings for said spindle, said upper bearing being pivotally supported at a point adjacent the foot of the cutter, means for securing the lower bearing in variously adjusted angular relations of the cutter shaft and a jack mounted in cooperative relation to the cutter shaft.

12. In a wood heel turning machine, an upright cutter spindle, upper and lower bearings for said spindle, said upper bearing being pivotally supported at a point adjacent the foot of the cutter, means for securing the lower bearing in variously adjusted angular relations of the cutter shaft, a jack mounted in cooperative relation to the cutter shaft and gage means cooperating with the shaft adjustment means for enabling duplication of various angular settings of the cutter shaft.

13. A wood heel turning machine comprising a cutter, a jack adjustable with respect thereto, a gage for the jack adjustable in respect to both the jack and the cutter for different heel sizes and provided with a scale for the different heel sizes, means for setting the cutter to different angles and a scale for such angular settings.

14. In a wood heel machine, a single upright cutter spindle, means for varying the inclination of said cutter spindle, a jack movably supported in relation to the cutter spindle and a gage for the jack adjustable in respect to both the jack and the cutter to determine the relation of the jack to the cutter spindle.

15. A single spindle wood heel turning machine, comprising an upright spindle, cutter blades carried thereby, a jack, a gage extending about both sides of the cutter axis to predeterminedly position the jack at both sides of the cutter and a track for the jack for guiding the jack to both sides of the cutter.

16. A wood heel turning machine comprising a cutter spindle, a heel block holding jack adjustable with respect to said cutter spindle, a gage for directing the jack about the cutter spindle, said gage being adjustable in respect to both the jack and cutter spindle and provided with a scale for indicating the proper setting of the same for different heel sizes, a pivotally supported bearing for the spindle enabling the setting of the cutter spindle at different angles, a scale for indicating the angular settings of the spindle for different heel sizes and means for driving the cutter spindle irrespective of the adjustments recited.

17. In a wood heel turning machine, a pivotally supported bearing bracket, a cutter spindle journaled in said bracket, a cutter carried by said spindle, means for securing the bearing bracket in different angularly adjusted positions of the cutter spindle, a heel block holding jack adjustable with respect to said cutter and adjustable means for guiding the jack in variably predetermined movements about the cutter independently of the angular settings of the cutter.

In witness whereof, I have hereunto set my hand this 12th day of December, 1924.

ANDREW C. HAUCK.